Oct. 8, 1940.  J. U. LEHN  2,216,919
ANIMAL TRAP
Filed July 20, 1939  2 Sheets—Sheet 1

INVENTOR
John U. Lehn
BY
Louis Prevost Whitaker
ATTORNEY

Oct. 8, 1940. J. U. LEHN 2,216,919
ANIMAL TRAP
Filed July 20, 1939 2 Sheets-Sheet 2
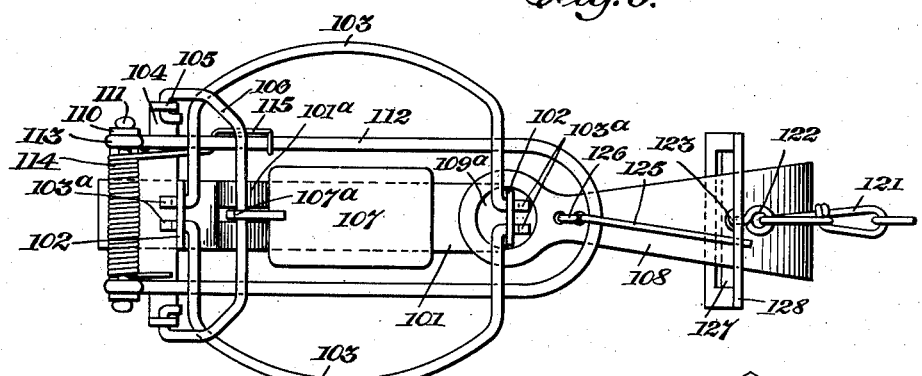
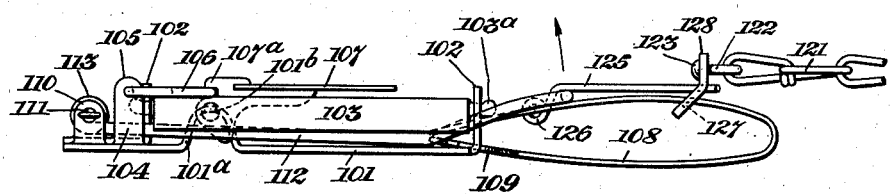
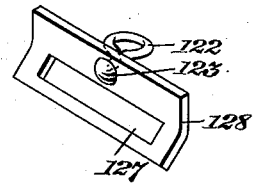
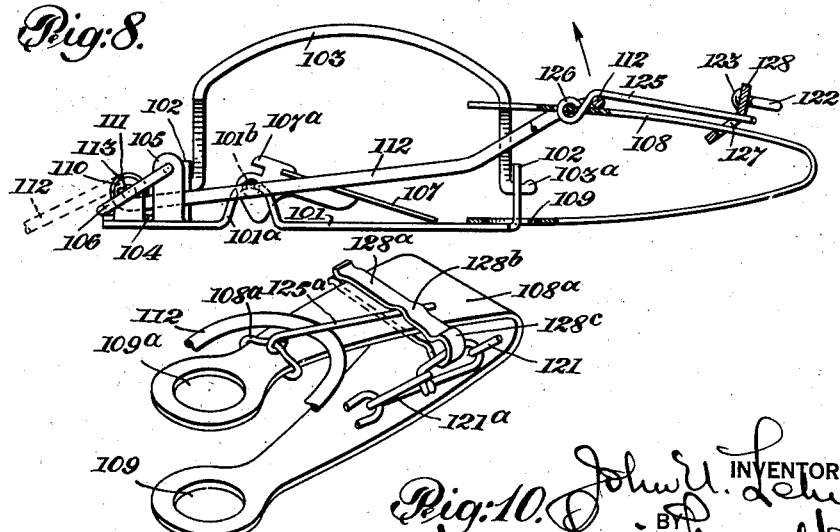

Patented Oct. 8, 1940

2,216,919

UNITED STATES PATENT OFFICE 2,216,919

ANIMAL TRAP

John U. Lehn, Lititz, Pa., assignor to Animal Trap Company of America, Lititz, Pa., a corporation of Pennsylvania Application July 20, 1939, Serial No. 285,469

9 Claims. (Cl. 43—90)

My invention consists in the novel features hereinafter described reference being had to the accompanying drawings which illustrate several embodiments of the same, selected by me for purposes of illustration, and the said invention is fully disclosed in the following description and claims.

My invention relates to animal traps such as are used in trapping muskrats and other animals, which are provided, in addition to the usual spring actuated jaws, with a leg embracing guard such as is illustrated, described and claimed in my former Letters Patent of the United States, No. 1,912,457, granted June 6, 1933, for the purpose of sliding up the leg of the animal caught in the jaws and engaging the body of the animal so as to push it away from the jaws to prevent the animal from "wringing off", as it is termed, by breaking the imprisoned leg, or gnawing it off and so making its escape.

My invention has for its object the provision of means for delaying the complete release of the guard when the trap is sprung until after the jaws have closed firmly upon the leg of the animal and the struggles of the animal have dragged the trap away from its anchoring means, and has placed such tension on the chain or other flexible connection connecting it thereto as to disengage the delayed action means and free the guard, which then operates in the usual manner. In case the jaws are sprung by a foreign object coming in contact with the pan, the guard will remain in the partially sprung position, which will indicate to the trapper the cause of the sprung trap.

In the accompanying drawings, I have shown my invention embodied in a trap of the jump type, in which a single arm leaf spring is employed to actuate the jaws, and also in a long spring trap in which a bent leaf spring having upper and lower arms is employed.

In the said drawings:

Fig. 6 is a long spring trap having a modified form of delayed action means embodied therein, the parts being shown in set position.

Fig. 7 is a side elevation of the trap as shown in Fig. 6.

Fig. 8 is a side elevation of the trap showing the jaws in closed or sprung position and the guard held by the delayed action means.

Fig. 9 is a detail perspective view of the delayed action plate shown in Figs. 6, 7 and 8.

Fig. 10 is a detail perspective view of a slightly modified form of delayed action means.

Figure 1:
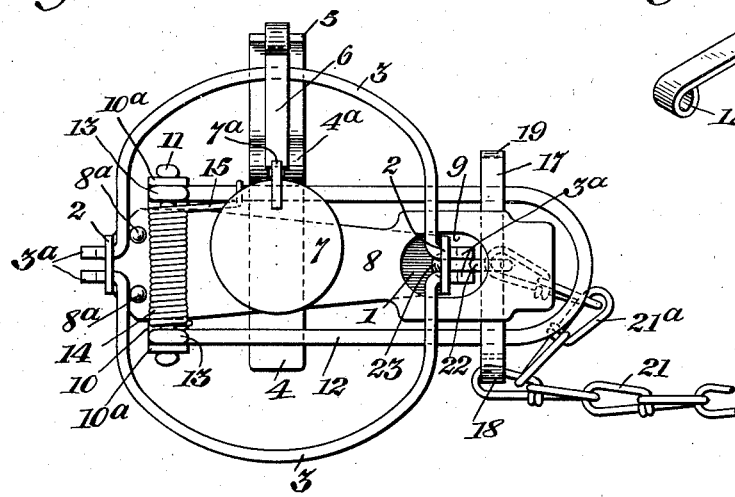
Fig. 1 is a plan view of a jump type trap embodying my invention, the parts being shown in set position.

In the embodiment of my invention shown in Figs. 1 to 4, inclusive, 1 represents the base having upturned portions 2, provided with pivotal apertures to receive the pivot portions 3a, 3a of the jaws 3, 3. 4 represents the cross provided with the pivoted latch 6, pivotally supported at 5 at the outer end of the cross. The cross is provided with the usual upwardly bent portion to which the pan 7 carrying the detent 7a is pivoted. 8 represents the jump spring connected at one end to the base 1 by rivets 8a or otherwise and provided at its outer end with an aperture 9 surrounding one of the upturned portions 2 of the base, the edges of the aperture 9 engaging the adjacent ends of the jaws and closing them in the released position of the trap.

The base is also provided in this instance with an auxiliary cross piece, secured to the base and having upturned end portions 10a perforated to receive a pivot shaft 11 for the guard 12, the arms of which are spaced laterally a distance greater than the width of the spring and have their ends provided with eyes 13 to engage the pivot shaft 11. A coiled spring 14 preferably surrounds the pivot shaft 11 and has one end engaging the cross piece 10 and the other end 15 connected with an arm of the guard, so as to move it in the direction of the arrows Figs. 2, 3.

To set the trap the guard is swung over until it is parallel with the spring, the spring 8 is depressed and the jaws are folded down into the positions shown in Fig. 1, upon the guard and spring, and the latch 6 is engaged with the detent 7a of the pan.

Figure 4:
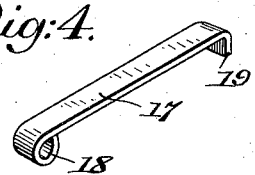
Fig. 4 is a perspective view of the delayed action bar.
Figure 2:
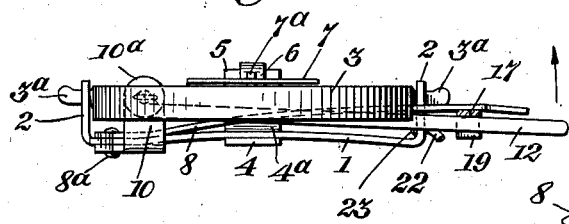
Fig. 2 is a side elevation of the trap as shown in Fig. 1.

To effect the delayed action of the guard I have shown a delayed action bar 17, illustrated in detail in Fig. 4, having an attaching eye 18 at one end and a downwardly bent stop or projection 19 at the other. The trap is provided with a flexible connection, preferably a chain 21, one end of which is permanently connected to the base 1, for example, by an eye 22 riveted at 23 to the upturned portion 2, adjacent to the free ends of the spring 8 and guard 12, and the eye 18 of the bar 17 is secured to an intermediate portion of the chain or connection 21, leaving a small amount of slack, indicated at 21a, between the bar 17 and the eye 22. This prevents the possibility of the bar 17 becoming disassociated from the trap and lost or mislaid, and also provides clearance for withdrawing the bar from between the guard and the spring before the chain is drawn taut. When the trap is fully set the delayed action bar 17 is inserted between the guard 12 and the spring 8 as shown in Figs. 1 and 2, the parts being so constructed that it will be held frictionally between the guard and spring, so that it will not be withdrawn by the weight of the trap. This permits of the trap being carried by the chain 21 while fully set, to the place, as the runway of the animal, where it is to be placed, and to be placed therein by means of the chain. The outer end of the chain or connection 21 will be provided with the usual anchoring pin or ring, or both, as may be desired.

When the trap is sprung by an animal depressing the pan 7 and releasing the pivoted latch the spring 8 will rise and close the jaws on the leg of the animal. The guard being also released it will rise with the spring 8, transmitting the force of its spring 14 through the delayed action bar 17 to the force of spring 8 in effecting the closing of the jaws, and holding the bar 17 firmly clamped between the guard and spring 8, until both are arrested by the engagement of the sides of the aperture 9, with the sides of the adjacent portions of the jaws 3, 3, as clearly shown in Fig. 3. This is especially advantageous when the trap is set under water as is often the case in muskrat trapping particularly, as the water retards the action of the trap so that the increased spring tension helps to overcome this slowing of the jaws. Under these conditions, also, a little time is required before the jaws take a firm hold on the animal's leg which is more or less slippery when wet. If the guard releases immediately after the snapping of the jaws, the tension of its spring sometimes aids the animal in its attempts to escape before the jaws of the trap are sufficiently set on its leg.

The trap is thus held in this partially released position until the struggles of the animal pull the chain taut and exert sufficient tension on it to withdraw the bar 17 from between the spring 8 and the guard when the guard is instantly released and functions in the usual manner. This is more easily done in the partially released position of the guard than in the completely set position, since the guard spring exerts less tension upon the bar than when the trap is fully set.

Figure 5:
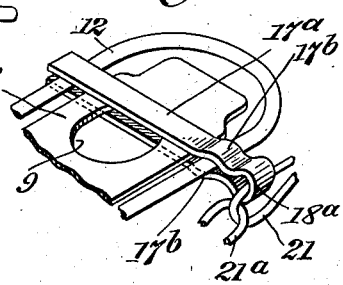
Fig. 5 is a detail perspective view of a portion of the jump spring and guard showing a modified form of delayed action means.
Figure 3:
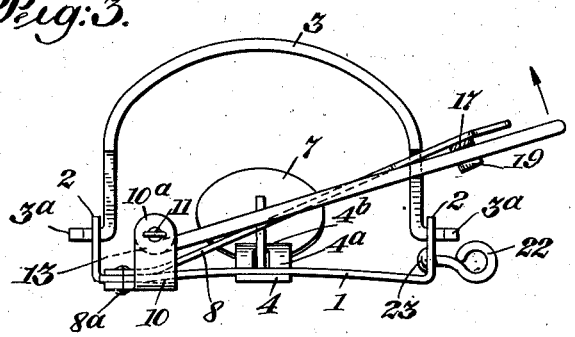
Fig. 3 is a side elevation of the trap showing the jaws released or sprung and the guard held by the delayed action means, before its final release.

In Fig. 5 I have shown a slightly modified construction in which I employ a spring hairpin clip 17a formed of a strip of metal bent to form two parallel arms which embrace the guard and spring between them. The clip is provided with an eye 18a at the central portion of the strip, to receive an intermediate link of the chain 21a and I may also, if desired, provide opposite portions of the arms of the clip with outwardly bent portions 17b to engage one (or both) arms of the guard, as clearly shown in Fig. 5, and hold the clip in place so that the trap can be carried by the chain when fully set, and drawn to the desired position on the ground, by means of the chain. The operation of this embodiment of my invention will be exactly as previously described, the clip holding the guard and spring together and adding the efficiency of the guard spring to the jaw spring 8 until the spring 8 is arrested by the jaws, and delaying the action of the guard until the struggles of the animal detach the clip and permit the guard to function in preventing wring offs.

In Figs. 6, 7, 8 and 9, in which the parts corresponding to those previously described are given the same reference numerals with the addition of 100, I have shown my invention embodied in a long spring trap, in which the jaws are actuated by a bent flat spring 108 having two arms each of which is provided at its end with an aperture. The aperture 109 in the lower arm surrounds one of the bent up portions 102 of the base 101, and the aperture 109 in the upper arm encloses the adjacent portions of the jaws 103, 103. The jaws and guard may obviously be held in set position by a latch pivoted to the usual cross, and engaging a detent on the pivoted pan, as in Figs. 1, 2 and 3, but in this instance I have shown the base 101 provided with a cross piece 104 carrying a pivoted bail 106, engaging apertures in the upturned ends of the cross piece and engaging a detent 107a on the pan 107 which is pivotally connected with the base. The guard 112 is mounted on a pivot shaft 111 engaging other upturned portions of the same (or another) cross piece and provided with the actuating spring 114.

In this embodiment the delayed action means comprises a detent lever 125 pivotally supported at one end as at 126 in any desired manner, as by forming two adjacent apertures in the upper spring arm before tempering and bending a portion of the detent arm therethrough to form an eye, as shown. This detent lever is adapted to extend over the outer end of the guard, in the set position of the trap and to have its outer end engaged by an aperture 127 in a slide 128 consisting of a plate having a sliding engagement with the upper spring arm. This plate is placed in engagement with the spring when the trap is assembled and cannot become detached therefrom. The detent lever is preferably formed of material having sufficient resilience so that when pressed down over the outer end of the guard, and engaged by the slide 128, it will press upwardly on the slide and create sufficient friction between the slide and the lower surface of the upper spring arm to permit the trap to be carried by the chain 121 or other anchoring connection, which in this instance is attached directly to the slide.

When the trap is sprung the jaws will be closed under the combined force of the jaw spring 108 and the guard spring 114 and the guard will be arrested in the partially released position by the detent lever 125, as shown in Fig. 8, until the struggles of the animal cause the slide to be pulled along the upper spring arm far enough to release the detent lever, which will instantly swing upward, and release the guard which then functions in the usual manner.

In some instances, instead of using the chain attaching slide just described, I may secure the detent lever to the upper spring arm by means of a clip similar to that shown in Fig. 5, as illustrated in Fig. 10. As shown in the latter figure, the detent lever 125a which in this instance pivotally engages a collar 108a, surrounding the upper spring arm, is held in set position by the clip 128a of the hairpin type, one arm of which engages the detent lever 125a and may be provided with an outwardly curved portion, as at 128b, to fit over said lever. The clip has an eye 128c engaging an intermediate link 102a of the chain 121 which in this construction will be secured at its inner end to the trap. For example, it may be secured by an eye bolt riveted to the base in the manner shown in Figs. 1, 2, 3, or extending through an aperture in the curved portion of the spring 108, or to a plate slipped over the spring similar to that shown in Fig. 9. A sufficient amount of slack will of course be provided between the connection of the chain with the trap, and its connection with the clip, to insure the clip being disengaged from the detent lever when the trap is moved by the trapped animal to draw the chain taut.

The indirect method of securing the guard to the spring so as to delay its complete action holds the guard securely yet allows it to become disengaged from the delayed action means with a minimum of force exerted by the animal in its struggles.

What I claim and desire to secure by Letters Patent is:

1. A trap having gripping means and a pivoted leg embracing guard, and spring actuating means therefor, locking means releasable by the animal for holding the jaws and guard in set position and releasing both when the trap is sprung, an anchoring connection for the trap, and delayed action means for arresting the guard in partially released position when the trap is sprung, operatively connected with said anchoring connection and constructed to fully release the guard by tension of the anchoring connection produced by the struggles of the animal caught in said jaws.

2. A trap having gripping means and a spring-actuated leg embracing guard, locking means releasable by the animal for holding said gripping means and guard in set position and releasing both when the trap is sprung, an anchoring connection for said trap, and separate holding means for said guard operatively connected with said anchoring connection and held in operative position by frictional engagement with said guard in the set position of the trap, to permit the trap to be carried in fully set position by said anchoring connection, said holding means preventing complete release of the guard when the trap is sprung, and adapted to be disengaged from the guard by the struggles of the animal to fully release the guard after the frictional tension is reduced by the partial release of the guard spring.

3. A trap having opposed jaws, a spring for closing said jaws, a pivoted leg embracing guard, a separate spring therefor, locking means releasable by the animal for holding the jaws and guard in set position, an anchoring connection for the trap, and delayed action means for said guard, comprising means for detachably securing said jaw spring and guard together to apply the combined force of said jaw actuating and guard actuating springs to the jaws, and to arrest the guard when the trap is sprung, said delayed action means being operatively connected with the anchoring connection, and being released by tension of the latter produced by struggles of the animal caught in said jaws.

4. A trap having opposed pivotal jaws, a spring for closing said jaws, a pivoted leg embracing guard, a separate spring therefor, locking means releasable by the animal for holding said jaws and guard in set position, an anchoring connection for said trap, and delayed action means for said guard comprising means for detachably connecting said guard actuating spring to the jaw actuating spring when the trap is sprung, and for arresting the guard in partially released position, said delayed action means being operatively connected with said anchoring means to effect the release of said guard by the struggles of the animal, and having portions frictionally engaging the spring to permit the trap in fully set position being transported and moved by means of said anchoring means.

5. A trap having opposed pivoted jaws, a spring for closing said jaws, a pivoted leg embracing guard, a separate spring therefor, locking means releasable by the animal for holding said jaws and guard in set position, an anchoring connection for said trap, and delayed action means for said guard comprising a part extending transversely of the guard and jaw spring and held detachably in frictional engagement therewith, and operatively connected with the anchoring connection, intermediate its ends, a slack portion of said connection being provided between said part and the connection of said anchoring connection with the trap.

6. A trap having opposed pivoted jaws, a spring for closing said jaws, a pivoted leg embracing guard, a separate spring therefor, locking means releasable by the animal for holding said jaws and guard in set position, an anchoring connection for said trap, and a delayed action bar adapted to be detachably interposed between said jaw spring and guard and to be frictionally held between them, said bar being connected to an intermediate portion of said anchoring connection with slack between said intermediate portion of the anchoring connection and its connection with the trap.

7. A trap having opposed pivoted jaws, a spring for closing said jaws, a pivoted leg embracing guard, a separate spring therefor, locking means releasable by the animal for holding said jaws and guard in set position, an anchoring connection for said trap, and a delayed action detent lever pivotally connected with said jaw actuating spring and adapted to releasably engage the guard in the set position of the trap, and means having a sliding engagement with said spring, and operatively connected with said anchoring connection for detachably engaging said detent lever.

8. A trap having opposed pivoted jaws, a spring for closing said jaws, a pivoted leg embracing guard, a separate spring therefor, locking means releasable by the animal for holding said jaws and guard in set position, an anchoring connection for said trap, and delayed action means comprising a clip detachably embracing said jaw actuating spring and serving to hold the guard in fixed relation therewith in the set position of the trap, said clip being connected with said anchoring connection at an intermediate point therein providing slack between said point and the connection of said anchoring connection to the trap.

9. A trap having opposed pivoted jaws, a spring for closing said jaws, a pivoted leg embracing guard, a separate spring therefor, locking means releasable by the animal for holding said jaw and guard in set position, an anchoring connection for said trap and delayed action means, comprising a clip detachably embracing and frictionally engaging said jaw actuating spring and said guard in the set position of the trap, said clip being connected to said anchoring connection at an intermediate point thereon with slack between said point and the connection of said anchoring connection with the trap.

JOHN U. LEHN.